(No Model.)
W. M. WILKIN.
SAW BUCKLE FOR RECIPROCATING SAWS.
No. 286,354. Patented Oct. 9, 1883.
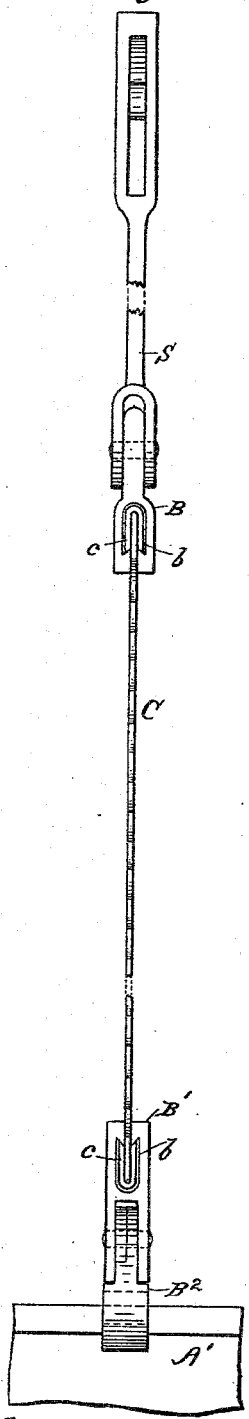
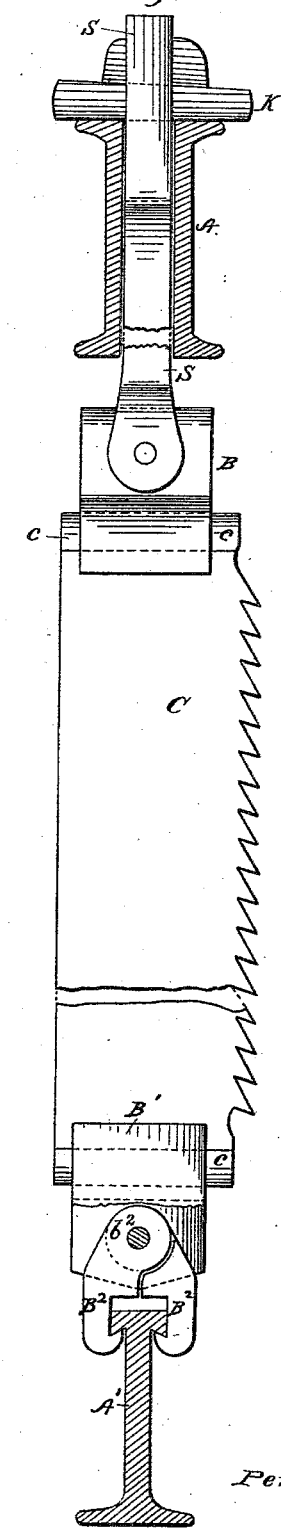
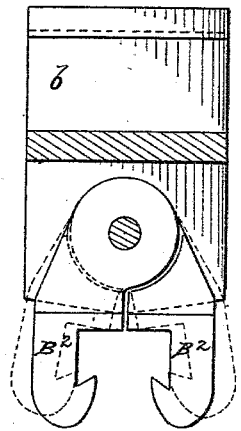
Witnesses.
W. R. Edelen
Robt. H. Porter.
Inventor
Wm. M. Wilkin
Per Hallock & Hallock
Att's

UNITED STATES PATENT OFFICE.

WILLIAM M. WILKIN, OF EAST SAGINAW, MICHIGAN.

SAW-BUCKLE FOR RECIPROCATING SAWS.

SPECIFICATION forming part of Letters Patent No. 286,354, dated October 9, 1883.

Application filed April 18, 1883. (No model.)

*To all whom it may concern:*

Be it known that I, WILLIAM M. WILKIN, a citizen of the United States, residing at East Saginaw, in the county of Saginaw and State of Michigan, have invented certain new and useful Improvements in Saw-Buckles for Reciprocating Saws; and I do hereby declare the following to be a full, clear, and exact description of the invention, such as will enable others skilled in the art to which it appertains to make and use the same.

This invention relates to the means for adjusting the saws in the sash of a reciprocating saw mill; and it consists in providing a new and improved saw-buckle.

The invention is shown in the accompanying drawings, as follows:

Figure 1 is a front or edge view of the saw and accompanying buckles. Fig. 2 is a side view of the same with the upper and lower girt of the saw-sash in section. Fig. 3 is a detail of construction of my improved saw-buckle, being a vertical section across the width of the buckle, the line of section being the saw-line.

A is the upper and A' the lower girt; B and B', the saw-buckles; S, the key-strap, and K the key; C, the saw; $c\,c$, the strap which overlaps the ends of the saw and forms a head thereon. $b$ is the eye in the buckle, in which the saw and head $c$ slip.

The new or novel feature of my buckle is the means for attaching to the lower girt; and this consists in a pair of grapples, $B^2\,B^2$, substantially as hereinafter described, pivoted on the lower part of the buckle, and adapted to hook over the T on the upper edge of the lower girt. The grippers or claws $B^2\,B^2$ are made so they can open far enough to reach over the T on the girt, when they will close under it. The under part of the T is made dovetail form and the grippers hook back under it, and when the saw is drawn taut by the key above, the grippers hold just as firmly to the girt as if they were solid. As soon as the saw is loosened, however, at the top to take it out, the grippers or claws can be drawn apart and unhooked from the girt, and in no way disturb the other buckles, and thus resulting in a great economy of time.

I am aware that this method of fastening the buckle to the lower girt is old, and broadly make no claim to that feature. Buckles, however, which have been made in this way are defective, in that they do not support the saw while the upper buckle is being keyed to the upper girt. The consequence is that the saw tilts to either one side or the other, and is liable to drop from the lower girt unless supported by the operator. I overcome this defect by making each of the claws $B^2$ with a slot, $b^3$, which register with each other. The upper part or top, $b^4$, of these combined slots is preferably flat, to correspond with the top of the girt. The sides $b^5$ are also preferably flat, and the hooks $b^6$ are of less length than that part of the claws which forms part of the top $b^4$. The effect of this construction is that the hooks $b^6$ may grasp the cross-piece of the girt, and at the same time have the two parts of the top $b^4$ on the same plane, so that said top may rest upon the top of the girt, without other support, while the operator is fixing the upper buckle and key in place.

I am aware that saw-buckles have been made with a gripping device at one end for embracing the part to which the saw is attached, and that I do not claim, as my device differs therefrom in that I provide the girt with a T-head, the vertical part of which forms a stop for the gripping-jaws, which cannot be set so that the points of the gripping device will not be in the proper position for clamping the girt; but What I do claim is—

1. In a saw-buckle, clamping-jaws hinged together, and having a flat-topped recess formed by the jaws, and hooks below and of less length than the top, substantially as and for the purpose set forth.

2. The combination of a girt having wings, and a saw-buckle having clamping-jaws hinged together, and provided with a flat-topped recess, and hooks below said top, substantially as and for the purpose set forth.

In testimony whereof I affix my signature in presence of two witnesses.

WILLIAM M. WILKIN.

Witnesses:
JNO. K. HALLOCK,
ROBT. H. PORTER.